United States Patent [19]

Khan et al.

[11] Patent Number: 5,217,625
[45] Date of Patent: Jun. 8, 1993

[54] PROCESS FOR DISPOSING OF SEWAGE SLUDGE

[75] Inventors: Motasimur R. Khan; Matthew A. McMahon, both of Wappingers Falls; Ronald J. McKeon, Beacon, all of N.Y.

[73] Assignee: Texaco Inc., White Plains, N.Y.

[21] Appl. No.: 955,806

[22] Filed: Oct. 2, 1992

[51] Int. Cl.$^5$ .......................... C02F 11/06; C10J 3/46
[52] U.S. Cl. ..................... 210/761; 210/769; 210/774; 210/806; 44/552; 48/197 R
[58] Field of Search ............... 210/609, 750, 751, 758, 210/761, 769–771, 774, 781, 783, 787, 806; 44/280, 552, 628; 48/197 R, 198.3, 202; 110/347

[56] References Cited

U.S. PATENT DOCUMENTS

| | | | |
|---|---|---|---|
| 3,507,788 | 4/1970 | Cole et al. | 210/761 |
| 3,687,646 | 8/1972 | Brent et al. | 210/761 |
| 3,803,806 | 4/1974 | Komline, Sr. | 210/769 |
| 4,052,176 | 10/1977 | Child et al. | 48/197 R |
| 4,074,981 | 2/1978 | Slater | 48/197 R |
| 4,097,378 | 6/1978 | St. Clair | 210/770 |
| 4,251,227 | 2/1981 | Othmer | 48/197 R |
| 4,543,190 | 9/1985 | Modell | 210/761 |
| 4,618,735 | 10/1986 | Bridle et al. | 48/197 A |
| 4,933,086 | 6/1990 | McMahon et al. | 210/761 |
| 4,983,296 | 1/1991 | McMahon et al. | 210/761 |

*Primary Examiner*—Thomas Wyse
*Attorney, Agent, or Firm*—James J. O'Loughlin; Albert Brent

[57] ABSTRACT

A process for disposing of sanitary sewage sludge by producing a pumpable slurry of sewage sludge with or without solid carbonaceous fuel and burning said slurry as fuel in a partial oxidation gas generator, furnace, or boiler. First, an aqueous slurry of sewage sludge is concentrated to produce sewage sludge cake. The sewage sludge cake is preheated and sheared while in contact with sulfuric or sulfurous acid to produce a pumpable acidified aqueous slurry of sewage sludge having a pH of about 1 to 5. After two-stage hydrothermal treatment with neutralization of the sewage sludge after the second hydrothermal stage, the solids content of the pumpable aqueous slurry of sewage sludge is increased. By means of the subject process, the viscosity of the slurry of sewage sludge with or without solid carbonaceous fuel is reduced and coagulation is suppressed. A pumpable aqueous slurry of sewage sludge with or without solid carbonaceous fuel is produced and burned with a free-oxygen containing gas in a partial oxidation gasifier, furnace, boiler, or incinerator to produce a hot raw effluent gas stream. In a preferred embodiment, the effluent gas stream is cleaned and purified and non-contaminating ash and slag are separated. By this process, noxious sewage sludge may be disposed of without contaminating the environment. By-product synthesis gas, reducing gas, or fuel gas may be produced.

14 Claims, No Drawings

PROCESS FOR DISPOSING OF SEWAGE SLUDGE

FIELD OF THE INVENTION

This invention relates to the processing of sanitary sewage sludge for use as a fuel in a partial oxidation gas generator, furnace, or boiler.

Treatment of sewage sludge is discussed in coassigned U.S. Pat. No. 3,507,788. Sewage sludge is gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention by which the solids in an aqueous slurry of sewage sludge are concentrated to produce sewage sludge cake. The sewage sludge cake is preheated and sheared while in contact with sulfuric or sulfurous acid to produce a pumpable acidified aqueous slurry of sewage sludge having a pH in the range of about 1 to 5. After two-stage hydrothermal treatment with neutralization of the sewage sludge after the second hydrothermal stage, the solids content of the pumpable aqueous slurry of sewage sludge is increased and the resulting pumpable aqueous slurry of sewage sludge with or without coal is burned as fuel in a partial oxidation gas generator, furnace, boiler, or incinerator. The viscosity of the pumpable slurry of sewage sludge for a given solids content is thereby reduced and coagulation is suppressed.

SUMMARY OF THE INVENTION

This invention pertains to an improved process for disposing of sanitary sewage sludge comprising:

(1) concentrating an aqueous slurry of sewage sludge having a solids content of about 3.0 wt. % or less to produce sewage sludge cake having a solids content in the range of about 20 to 40 wt. %;

(2) preheating by indirect heat exchange and shearing at a temperature in the range of about 130° F. to 210° F. and at atmospheric pressure for a period of about 2 to 10 minutes and acidifying the sewage sludge cake from (1) to produce an acidified aqueous slurry of sewage sludge having a pH in the range of about 1 to 5 and having a solids content in the range of about 15 to 40 wt. %;

(3) heating the acidified aqueous slurry of sewage sludge from (2) in the absence of air at a temperature in the range of about 213° F. to 375° F. and at a pressure above the vapor pressure of water at that temperature, in a first hydrothermal treating zone, and holding said pumpable acidified aqueous slurry of sewage sludge at said elevated temperature for about 5 to 45 minutes;

(4) hydrothermally treating the aqueous slurry of sewage sludge from (3) in an autoclave in the absence of air for about 30 to 60 minutes at a temperature in the range of about 400° F. to 450° F. by indirect heat exchange and at a pressure which is above the vapor pressure of water at that temperature;

(5) neutralizing the acidified aqueous slurry of sewage sludge from (4) to provide a pH in the range of about 6.5 to 7.5;

(6) increasing the solids content of the pumpable aqueous slurry of sewage sludge produced in (5) to about 40 to 58 wt. %; and (7) burning the pumpable aqueous slurry of sewage sludge produced in (6) in a partial oxidation gasifier, furnace, boiler, or incinerator to produce a hot raw effluent gas stream.

In one embodiment to avoid contaminating the environment, the effluent gas stream from (7) is cleaned, purified, and non-contaminating fly-ash and slag are separated from the gas stream.

DESCRIPTION OF THE INVENTION

Sewage sludge is a heterogeneous mixture of complex organic and inorganic materials. The term "sewage sludge" as used herein may be broadly defined as "water-carried wastes", particularly from municipal sanitary sewage lines, containing at least one of the following: body waste (excreta), household wastes, community waste such as street washings, etc., and industrial wastes and sludges. The total solids content of the sewage in municipal lines is usually about 500 parts per million (p.p.m.) or more. The solids in sewage are mostly animal or vegetable substances, "organic matter", i.e., fats, carbohydrates, and proteins. Some mineral or inorganic constituents present include sand and clay, as well as the common mineral salts found in the water supply. Sewage sludge is obtained from raw sewage and may contain a number of pathogens known to be health hazards to humans. Almost any type of microorganism may be found in sewage, including bacteria, protozoans, viruses and fungi.

Sewage sludge does not behave as a Newtonian fluid. Accordingly, any analyses of sludge flow behavior in pipes is rather difficult. A major problem is the energy (head) loss in sludge transfer due to friction. Sludge slurries with 10–15% concentration can be pumped provided high friction losses are allowable. The physical state of sludge depends upon the amount of moisture present in the sludge and on the nature of the sludge. As the moisture content decreases, the sludge changes state from a true liquid to a semi-solid and ultimately to a dry solid. Through the use of gravity thickening the sludge could approach 3–5% by weight of solids concentration. However, the void spaces between the particles are still filled with water. As the moisture content decreases further, the solids are pushed closer together. The capillary forces continue to increase in the pore structure which progressively decreases the sludge volume. At this point the sludge is considered almost solid (plastic or semi-solid) rather than a liquid. With a further reduction in water content the nature of sludge is changed to such a state that it will not flow under its own weight. Plastic sludges are cohesive in nature due to the surface chemical activity and the bonding properties of the organic and inorganic colloidal materials present.

With landfills closing, ocean dumping being curtailed, and high-technology incinerators becoming unpopular in many areas, communities are finding that it is getting increasingly more difficult and expensive to dispose of their sewage sludge. Pumpable aqueous slurries of sewage sludge are made by the subject process containing high concentrations of sewage sludge. The pumpable slurry may be used as a fuel in a partial oxidation gas generator and may be thereby disposed of without contaminating the atmosphere. After cleaning and removal of undesirable gases e.g. $H_2O$, $H_2S$, COS, $CO_2$, a non-polluting hot raw effluent gas stream comprising at least one of the following is produced: synthesis gas, reducing gas and fuel gas. In one embodiment, the slurry may be burned by complete combustion in a boiler thereby producing by-product steam and hot water. Alternatively, the pumpable slurry may be incinerated or used as fuel in a furnace. Noxious sewage sludge is safely disposed of by the subject process without polluting the nation,s environment. Non-contaminating ash and slag are separated from the gas stream. The ash and slag may be used for road bed fill and for making cement blocks. Further, the subject process allows a greater amount of sewage sludge to be fed to a partial oxidation gasifier, boiler, or incinerator while requiring less energy per unit mass of sewage sludge processed.

A typical ultimate analysis of sewage sludge is shown in Table I. A typical ultimate analysis of inert non-combustible materials in sewage sludge is shown in Table II.

TABLE I

TYPICAL ULTIMATE ANALYSIS OF COMBUSTIBLES IN SEWAGE SLUDGE

| ELEMENT | WT. % |
|---|---|
| CARBON | 54.6 |
| HYDROGEN | 7.9 |
| NITROGEN | 4.5 |
| OXYGEN | 32.0 |
| SULFUR | 1.0 |

TABLE II

TYPICAL ANALYSIS OF INERT NON-COMBUSTIBLE MATERIALS IN SEWAGE SLUDGE

| ELEMENT | MG/KG DRY SOLIDS |
|---|---|
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping fee received from the sludge generating community and the concentration of sewage sludge that can be included in a pumpable slurry destined for the gasifier. Mixtures of sewage sludge and solid carbonaceous fuel that contain sufficient sewage sludge to be profitably burned were found to be too viscous to be pumped. This problem and others have been overcome by the subject invention.

Sewage sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers, Handbook, McGraw-Hill, Fourth Edition, 1963, page 19-50. Detention time in the sedimentation tank is sufficient for producing a pumpable aqueous slurry of primary sludge having a A solids content of about 0.5 to 20 wt. %, in about 1 to 24 hours. The primary sedimentation tank may also serve as a hold-up tank to even out discontinuities in the sewage composition. Alternatively, a separate holding tank may be used. In one embodiment, an aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, to reduce the BOD and organic solids content, and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. No. 3,687,646, which is incorporated herein by reference.

The water separated from the sewage sludge may be purified by conventional means. The purified water may be then used subsequently in the process. For example, the water may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, the hot water or steam may be used to preheat the aqueous suspension of sewage sludge. Hot water separated from the system may be used to prepare aqueous slurries of solid carbonaceous fuel e.g. coal. Excess water may be discharged from the system or used externally for industrial applications. The sludge underflow from the primary sedimentation tank comprising primary sewage sludge or from the holding tank comprising primary sewage sludge in admixture with secondary sewage sludge having a solids content of at least 3 wt. % is dewatered further to produce an aqueous slurry of sewage sludge having a solids content in the range of about 5 to 35 wt. %. Dewatering may be achieved by conventional means, e.g. filter press, hydroclone, centrifuge.

Preparation of a highly loaded sludge-water slurry with o desirable rheological properties requires an understanding of primary sludge characteristics and the relationship of these characteristics to the basic interactions among sludge particles. Since the sludge materials contain numerous chemically active sites, the factors which influence the slurry properties are many.

In the first step of a preferred embodiment of the subject process, an aqueous slurry of sewage sludge having a solids content of about 3 wt. % or less is concentrated to produce a solid sewage sludge cake having a solids content in the range of about 20 to 40 wt. %. The sewage sludge cake is then heated, sheared and acidified to produce a pumpable slurry having a pH in the range of 1 to 5, such as 2 to 3. The pumpable, acidified slurry of sewage sludge is then put through a two-step hydrothermal process with neutralization after the second hydrothermal step. The solids content of the neutralized aqueous slurry of sewage sludge is increased to a value in the range of about 40 to 58 wt. %. The resulting pumpable aqueous slurry of sewage sludge is reacted as feed in a partial oxidation gasifier to produce synthesis gas, fuel gas, or reducing gas or burned in a furnace, boiler or incinerator to produce a stream of flue gas.

It was unexpectedly found that the morphology of sewage sludge is changed by treating the sewage sludge as specified herein. For example, bound water is released and slurry making is optimized. Slurries containing a higher concentration of solids can be achieved. In the first step of the subject process, sewage sludge is concentrated to produce sewage sludge cake having a solids content of about 20 to 40 wt. % by means of conventional methods. For example, the aqueous slurry of sewage sludge may be pressed between two moving belts that pass between and over rollers. Liquid water is thereby quickly pressed from the material between the belts. For example, the Andritz Co., Arlington, Texas, continuous press filter operating at ambient conditions with a surface pressure of about 20 psi or more will produce a press cake having a solids content in the range of about 20 to 40 wt. % or more. In another embodiment, the sewage sludge may be concentrated by a combination of continuous belt pressure filtering and centrifuging. For example, after first concentrating the sewage sludge in a belt filter press, additional dewatering is provided by heating the slurry of sewage sludge to a temperature in the range of about 212° F. to 285° F. and centrifuging.

Preferably, the aforesaid concentration takes place before any significant bacterial action occurs that consumes carbon and organic materials in the sewage sludge.

In the next step, the sewage sludge cake having a solids content in the range of about 20 to 40 wt. % is simultaneously preheated, sheared, and acidified at about atmospheric pressure, and at a temperature in the range of about 130° F. to 210° F., such as about 150° F. to 200° F. for a period in the range of about 2 minutes to 10 minutes, such as about 3 minutes to 5 minutes. Sufficient sulfuric e.g. 50 wt. % $H_2SO$. or more or sulfurous acid is mixed with the sewage sludge cake to produce a pumpable acidified aqueous slurry of sewage sludge having a pH in the range of about 1 to 5, such as about 2 to 3, and a solids content in the range of about 15 to 40 wt. %. A steam jacketed tank equipped with a vertical motorized rotary stirrer may be used to provide the simultaneous heating, mild shearing, and acidifying at atmospheric pressure. A minimum shear of about 1000 per minute is applied by the rotating stirrer. In another embodiment, the heating, mixing and shearing means preferably contains a plurality of rotating agitators on one or two parallel rotatable shafts. Each shaft contains a plurality e.g. about 6 to 30 of agitators or mixing paddles or blades. One embodiment has two parallel shafts of agitators which rotate in the same direction at a speed of about 50 to 600 rpm within a chamber that conforms closely to the shape of the agitator assembly. A close clearance e.g. about 0.030" to 0.060" is thereby provided between the agitators and the inside wall of said chamber. A most effective mixing, shearing and self-cleaning action is thereby provided. For example, a suitable continuous processor is made by Teledyne Readco of York, Pa. See U.S. Pat. No. 3,823,921, which is incorporated herein by reference. The flow rate of material through this continuous processor is in the range of about 50 to 600 lbs per minute. The rate of shear is about 1000 per minute. The particle size of the processed material is in the range of about 1 to 1000 microns, such as about 20 to 200 microns. A homogeneous pumpable acidified aqueous slurry of sewage sludge having a solids content in the range of about 15 to 40 wt. % and a viscosity of less than about 2000 centipoise when measured at 180° F., such as less than about 1200 centipoise when measured at 180° F., is thereby produced.

Next, the preheated, sheared and acidified aqueous slurry of sewage sludge is hydrothermally treated in two stages. The acidified aqueous slurry of sewage sludge is neutralized to a pH in the range of about 6.5 to 8.5 after the second hydrothermal stage. The first hydrothermal stage preferably takes place in a conventional double tube indirect heat exchanger, spiral heat exchanger, or shell and tube heat exchanger. The pumpable acidified aqueous slurry of sewage sludge is heated at a temperature in the range of about 213° F. to 375° F. in the absence of air and at a pressure which is at or above the vapor pressure of water at the heat treating temperature. The pumpable acidified aqueous slurry of sewage sludge is held at said elevated temperature for about 5 to 45 minutes. In one embodiment, the preheated and sheared acidified aqueous slurry of sewage sludge is heated in the first hydrothermal stage by direct contact with hot nitrogen gas or steam.

After the aforesaid first hydrothermal step, the acidified pumpable aqueous slurry of sewage sludge having a solids content in the range of about 15 to 40 wt. % is again hydrothermally treated but this time in an autoclave at a temperature in the range of about 400° F. to 450° F., in the absence of air, for a residence time of about 30 to 60 minutes and at a pressure which is at or above the vapor pressure of water at said temperature. A pumpable acidified aqueous slurry of sewage sludge is thereby produced having a solids content in the range of about 15 to 40 wt. % and a viscosity of less than about 700 centipoise when measured at about 180° F. In the autoclave, the acidified aqueous slurry of sewage sludge may be heated by indirect heat exchange. For example, steam or partially cooled synthesis gas produced downstream in the partial oxidation process may be used in indirect heat exchange with the slurry of acidified sewage sludge. Hydrothermal treating of the acidified aqueous slurry of sewage sludge as previously described causes decarboxylation and dehydrogenation of the sewage sludge. The sewage sludge fibers and gel structure break down. The acids catalyze the degradation of cellulose and fats at lower hydrothermal temperatures and shorter residence times. The higher heating value (HHV) of the carbonaceous fuel will be upgraded about 10 to 20% by this two-stage acidified hydrothermal treatment. Sewage sludge with a particle size in the range of about 5 to 20 microns is thereby produced. Aqueous slurries of sewage sludge with highly pumpable characteristics are thereby produced. Further, the oxygen in the sulfuric or sulfurous acid is available in the subsequent partial oxidation reaction. This reduces the amount of expensive oxygen gas required in the partial oxidation step. Off-gas from the hydrothermal reactors comprising $CO_2$, $H_2O$, $H_2S$ and COS is sent to a conventional odor control unit and/or disinfecting zone. Noxious gases are thereby safely disposed of without polluting the nation's environment. In one embodiment, sulfur-containing gases from the hydrothermal reactors and from purification of the synthesis gas produced subsequently, may be recycled to the acid-treating step. The quantity of acid used to reduce the pH of the sewage sludge cake is thereby reduced.

In one embodiment, hot water at a temperature in the range of about 300° F. to 400° F. separates from the acidified aqueous slurry of sewage sludge and may be removed from the bottom of the second hydrothermal reactor e.g. autoclave. The hot water may be used in indirect heat exchange with the slurry of acidified sewage sludge in the first hydrothermal treating zone. Alternatively, the hot water may be introduced into the jacket of the heating, mixing and shearing means used originally to preheat the acidified sewage sludge cake. In another embodiment, at least a portion of the fuel gas produced by the subject partial oxidation mode is burned to provide the thermal energy to produce steam. The steam is then used to heat the materials in at least one of the aforesaid preheating and hydrothermal steps.

It was not clear whether the acid catalyzed hydrothermally treated aqueous slurry of sewage sludge with or without additional coal would be pumpable in comparison with simple hydrothermally treated sewage sludge. The product remaining after the acid catalyzed hydrothermal treatment could very well have been less tractable and less pumpable than desired. Thus, it was pleasing and somewhat surprising to find that the product of acid catalyzed hydrothermal treatment formed pumpable slurries having a greater solids content than that which can be produced from aqueous slurries of sewage sludge that were hydrothermally treated without the acid catalyst. Further, advantageously, the acid catalyzed hydrothermal process may be operated at lower temperatures and shorter residence times.

Next, the acidified pumpable aqueous slurry of sewage sludge leaving the second hydrothermal stage is neutralized with a base material to provide a pumpable aqueous slurry of sewage sludge having a pH in the range of about 6.5 to 7.5, such as about 7.0. Suitable base materials may be selected from the group consisting of calcium carbonate, lime, sodium meta silicate, and sodium hydroxide.

After the neutralization step, the solids content of the hydrothermally treated neutralized aqueous slurry of sewage sludge is increased to a value in the range of about 40 to 58 wt. % to provide a pumpable neutralized aqueous slurry of sewage sludge with or without solid carbonaceous fuel by any one or a combination of the following steps:

(a) Flash evaporation of excess water.

(b) Cooling said aqueous slurry of sewage sludge to a temperature in the range of about 75° F. to 150° F. and flashing off and/or centrifuging off excess water.

(c) Cooling said aqueous slurry of sewage sludge to a temperature in the range of about 75° F to 180° F. and adding dry powdered solid carbonaceous fuel.

(d) Cooling said aqueous slurry of sewage sludge to a temperature in the range of about 75° F. to 180° F. and mixing same with a pumpable aqueous slurry of solid carbonaceous fuel having a solids content in the range of about 45 to 60 wt. %. A pumpable aqueous slurry of sewage sludge and solid carbonaceous fuel is thereby provided containing about 8 to 60 wt. % sewage sludge and having a temperature in the range of about 80° F. to 145° F.

By definition, the term solid carbonaceous fuel, as used herein and in (c) and (d) above to describe suitable solid carbonaceous materials is intended to include various materials and mixtures thereof from the group consisting of coal, coke from coal, char from coal, petroleum coke, particulate carbon soot, oil shale, tar sands, asphalt, wood, and pitch. The types of coal that may be used include anthracite and bituminous. The particulate carbon may be that which is obtained as a by-product of the subject partial oxidation process (to be further described), or that which is obtained by burning fossil fuels. The term solid carbonaceous fuel also includes by definition semi-solid organic materials such as asphalt, rubber and rubber-like materials including rubber automobile tires which may be ground or pulverized to the aforesaid particle size. Any suitable grinding system may be used to convert the solid carbonaceous fuels or mixtures thereof to the proper size.

The moisture content of the solid carbonaceous fuel particles is in the range of about 0 to 2 weight percent and preferably 0 to 1 weight percent. Predrying may be required in some instances to reach these levels.

The solid carbonaceous fuels are preferably ground to a particle size so that 100% of the material passes through an ASTM E 11-70 Sieve Designation Standard 425 $\mu$ (Alternative No. 40) and at least 80% passes through an ASTM E 11-70 Sieve Designation Standard 75 (Alternative No. 200). $1000\mu = 1$ mm. The ground solid carbonaceous fuel is then introduced into a storage hopper at room temperature and atmospheric pressure.

The higher heating value (HHV) of the slurry of sewage sludge with or without solid carbonaceous fuel as produced by the subject process is in the range of about 4,000 to 10,000 BTU/Lb, say about 6,400 BTU/Lb. All of the higher heating values expressed herein are on the dry basis for the materials.

The pumpable aqueous slurry of sewage sludge optionally in admixture with solid carbonaceous fuel having a solids content in the range of about 40 to 58 wt. % as produced herein is burned in a partial oxidation gasifier, furnace, boiler, or incinerator to produce an effluent gas stream. In one embodiment, the effluent gas stream is washed and purified. Non-polluting ash and noxious gases are removed by conventional means. Contamination of the environment is prevented.

In a preferred embodiment, the fuel feedstream, for example, the aqueous slurry of sewage sludge with or without solid carbonaceous fuel, and a stream of free-oxygen containing gas are introduced by means of a burner into a free-flow unobstructed down-flowing vertical refractory lined steel wall pressure vessel where the partial oxidation reaction takes place. A typical gas generator is shown and described in coassigned U.S. Pat. No. 3,544,291, which is incorporated herein by reference. The burner assembly is inserted downward through a top inlet port of the non-catalytic synthesis gas generator. The burner extends along the central longitudinal axis of the gas generator with the downstream end discharging a multiphase mixture of fuel, free-oxygen containing gas, and temperature moderator directly into the reaction zone.

A three or four stream annular-type burner, such as shown and described in coassigned U.S. Pat. Nos. 3,847,564 and 4,525,175, which are incorporated herein by reference, is preferably used to introduce the feedstreams into the partial oxidation gas generator. Other suitable burner designs may be used. For example, with respect to U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole percent $O_2$, oxygen enriched air i.e. greater than 21 mole percent $O_2$, and air. The free-oxygen containing gas is supplied at a temperature in the range of about 100° F. to 1000° F. The aqueous slurry of pretreated sewage sludge with or without solid carbonaceous fuel e.g. coal is passed through the intermediate annular passage 16 at a temperature in the range of about ambient to 650° F.

In the partial oxidation process, the weight ratio of $H_2O$ to carbon in the feed is in the range of about 0.2 to 3.0, such as about 1.0 to 2.0. The atomic ratio of free-oxygen to carbon in the feed is in the range of about 0.70 to 1.3, such as about 0.90 to 1.1. Advantageously, the high amount of combined oxygen in the sewage sludge reduces the amount of free-oxygen.

The relative proportion of solid fuels, sewage sludge, water and oxygen in the feedstreams to the partial oxidation gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. The pressure is in the range of about 1–300 atmospheres. Preferably the temperature in the gasifier is in the range of about 2200° F. to 2800° F., so that molten slag is produced.

The dwell time in the reaction zone is in the range of about 1 to 10 seconds, and preferably in the range of about 2 to 8 seconds. With substantially pure oxygen feed to the partial oxidation gas generator, the composition of the effluent gas from the gas generator in mole percent dry basis may be as follows: $H_2$ 10 to 60, CO 20 to 60, $CO_2$ 5 to 40, $CH_4$ 0.01 to 5, $H_2S+COS$ 0 to 5, $N_2$ nil to 5, and Ar nil to 1.5. With air feed to the gas generator, the composition of the generator effluent gas in mole percent dry basis may be about as follows: $H_2$ 2 to 20, CO 5 to 35, $CO_2$ 5 to 25, $CH_4$ 0 to 2, $H_2S+COS$ 0 to 3, $N_2$ 45 to 80, and Ar 0.5 to 1.5. Unconverted carbon, ash, or molten slag are contained in the effluent gas stream. Depending on the composition and use, the effluent gas stream from the partial oxidation gasifier is called synthesis gas, reducing gas, or fuel gas. In one embodiment, fuel gas is produced and burned to provide the thermal energy to heat the acidified sewage sludge cake in the preheating and shearing step (2) page 2 and the acidified aqueous slurry of sewage sludge in steps (3) and (5) page 2. Coal has a high ash content e.g. about 10 to 30 wt. %. Advantageously, when coal is used as the supplemental fuel the coal ash will encapsulate the non-combustible materials in the sewage sludge, and the encapsulated material will flow from the reaction zone of the gas generator as substantially inert non-contaminating ash and molten slag.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in a gas cooler. The gas stream from the partial oxidation gasifier or the flue gas from the furnace, boiler, or incinerator may be cleaned and purified by conventional methods. For example, reference is made to coassigned U.S. Pat. No. 4,052,176, which is included herein by reference for removal of $H_2S$, COS, and $CO_2$. Fly-ash and slag may be removed by quenching the process gas stream in a conventional quench tank and/or by scrubbing. See coassigned U.S. Pat. Nos. 3,232,728; 3,524,630; and 4,801,307, which are incorporated herein by reference.

Although modifications and variations of the invention may be made without departing from the spirit and scope thereof, only such limitations should be imposed as are indicated in the appended claims.

We claim:

1. A process for disposing of sewage sludge comprising:
    (1) concentrating an aqueous slurry of sewage sludge having a solids content of about 3.0 wt. % or less to produce sewage sludge cake having a solids content in the range of about 20 to 40 wt. %;
    (2) preheating by indirect heat exchange and shearing temperature in the range of about 130° F. to 210° F. and at atmospheric pressure for a period of about 2 to 10 minutes and acidifying the sewage sludge cake from (1) to produce an acidified aqueous slurry of sewage sludge having a pH in the range of about 1 to 5 and having a solids content in the range of about 15 to 40 wt. %;
    (3) heating the acidified aqueous slurry of sewage sludge from (2) in the absence of air at a temperature in the range of about 213° F. to 375° F. and at a pressure above the vapor pressure of water at that temperature, in a first hydrothermal treating zone, and holding said pumpable acidified aqueous slurry of sewage sludge at said elevated temperature for about 5 to 45 minutes;
    (4) hydrothermally treating the aqueous slurry of sewage sludge from (3) in an autoclave in the absence of air for about 30 to 60 minutes at a temperature in the range of about 400° F. to 450° F. by indirect heat exchange and at a pressure which is above the vapor pressure of water at that temperature;
    (5) neutralizing the acidified aqueous slurry of sewage sludge from (4) to provide a pH in the range of about 6.5 to 7.5;
    (6) increasing the solids content of the pumpable aqueous slurry of sewage sludge produced in (5) to about 40 to 58 wt. %; and
    (7) burning the pumpable aqueous slurry of sewage sludge produced in (6) in a partial oxidation gasifier, furnace, boiler, or incinerator to produce a hot raw effluent gas stream.

2. The process of claim 1 wherein the aqueous slurry of sewage sludge is concentrated in (1) by any one or a combination of the following steps:
    a. belt filter pressing,
    b. centrifuge, c. hydroclone 3. The process of claim 1 wherein the sewage sludge cake is acidified in (2) with sulfuric or sulfurous acid.

4. The process of claim 3 wherein said sulfuric acid comprises 50 wt. % $H_2SO$.

5. The process of claim 1 where in (2) the sewage sludge cake is simultaneously preheated, sheared and acidified in a steam jacketed tank equipped with a motorized rotary stirrer which applies a minimum shear of about 1000 per minute.

6. The process of claim 1 where in (2) the sewage sludge cake is simultaneously preheated, sheared and acidified in a steam jacketed horizontal tubular shaped heating, mixing and shearing means comprising a plurality of rotating agitators on one or two parallel rotatable shafts.

7. The process of claim 1 where in (3) said acidified aqueous slurry of sewage sludge from (2) is heated by passing it through a double tube indirect heat exchanger, spiral heat exchanger, or shell and tube heat exchanger.

8. The process of claim 1 where in (3) said acidified aqueous slurry of sewage sludge from (2) is heated by direct contact with hot nitrogen gas or steam.

9. The process of claim 1 where in (5), the aqueous slurry of sewage sludge is mixed with a base material selected from the group consisting of calcium carbonate, lime, sodium meta silicate, and sodium hydroxide.

10. The process of claim 1 where in (6) the solids content of said pumpable aqueous slurry of sewage sludge from (5) is increased by at least one of the following steps:

(a) Flash evaporation of excess water;
(b) Cooling said pumpable aqueous slurry of sewage sludge from (5) to a temperature in the range of about 75° F. to 150° F. and flashing off and/or centrifuging off excess water;
(c) Cooling said pumpable aqueous slurry of sewage sludge from (5) to a temperature in the range of about 75° F. to 180° F. and adding dry powdered solid carbonaceous fuel; and
(d) Cooling said pumpable aqueous slurry of sewage sludge from (5) to a temperature in the range of about 75° F. to 180° F. and mixing same with a pumpable aqueous slurry of solid carbonaceous fuel having a solids content in the range of about 45 to 60 wt. % to provide a pumpable aqueous slurry of sewage sludge and solid carbonaceous fuel having a solids content in the range of about 48 to 58 wt. % and containing about 8 to 60 wt. % sewage sludge.

11. The process of claim 1 provided with the step of separating hot water at a temperature in the range of about 300 F to 500° F. from the autoclave in (4) and preheating the acidified sewage sludge cake in (2) by indirect heat exchange with said hot water.

12. The process of claim 1 provided with the step of separating hot water at a temperature in the range of about 300° F. to 500° F. from the autoclave in (4) and preheating the acidified slurry of sewage sludge in (3) by indirect heat exchange with said hot water.

13. The process of claim 1 where in (7) said aqueous slurry of sewage sludge is burned in a partial oxidation gas generator to produce synthesis gas, fuel gas, or reducing gas.

14. The process of claim 13 wherein said fuel gas is burned to provide the thermal energy to produce steam which is used to heat the materials in at least one of steps (2), (3), and (4).

* * * * *